United States Patent [19]

Schmutz et al.

[11] Patent Number: 4,549,989
[45] Date of Patent: Oct. 29, 1985

[54] PROCESS FOR THE PREPARATION OF MONOAMINOANTHRAQUINONES

[75] Inventors: Paul Schmutz, Münchenstein; Hans-Jörg Angliker, Reinach, both of Switzerland

[73] Assignee: Ciba-Geigy AG, Basel, Switzerland

[21] Appl. No.: 540,734

[22] Filed: Oct. 11, 1983

[30] Foreign Application Priority Data

Oct. 19, 1982 [CH] Switzerland .......................... 6083/82

[51] Int. Cl.$^4$ ....................... C07C 97/24; C07C 97/26
[52] U.S. Cl. .................................... 260/378; 260/380; 260/381; 260/371
[58] Field of Search ................ 260/378, 380, 381, 371

[56] References Cited

U.S. PATENT DOCUMENTS 4,016,182  4/1977  Buecheler .......................... 260/371

FOREIGN PATENT DOCUMENTS 0046863  7/1981  European Pat. Off. ............ 260/378

OTHER PUBLICATIONS

Takeda et al., *Chemical Abstract*, vol. 87, No. 39178k, 1/11/77.

Müller & Bayer, *Methoden der Organischen Chemie* (Houben-Weyl), Band VII/3c, 1974, pp. 158–160.

*Primary Examiner*—Glennon H. Hollrah
*Assistant Examiner*—Raymond Covington
*Attorney, Agent, or Firm*—Edward McC. Roberts; Kevin T. Mansfield

[57] ABSTRACT

The invention relates to a process for the preparation of monoaminoanthraquinones of the formula

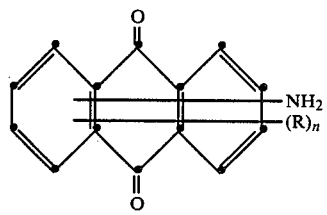

wherein R is a non-ionic substituent and n is 0, 1, 2 or 3, by reduction of corresponding mononitroanthraquinones, which process comprises reacting said mononitroanthraquinones with formaldehyde, in the presence of a base and a catalyst, in an aqueous alcoholic solution.

6 Claims, No Drawings

PROCESS FOR THE PREPARATION OF MONOAMINOANTHRAQUINONES

The present invention relates to a process for the preparation of monoaminoanthraquinones, to the monoaminoanthraquinones obtained by said process, and to the use of these compounds as intermediates for obtaining dyes.

It is known from European patent application 46863 that 1-aminoanthraquinone-2-carboxylic acid can be obtained by reacting 1-nitroanthraquinone-2-carboxylic acid with formaldehyde in the presence of a base. However, it is not possible, or only possible with great difficulty, to carry out the reduction of 1-nitroanthraquinone by means of this process.

Surprisingly, it has now been found that mononitroanthraquinones can be reduced with formaldehyde to the corresponding monoaminoanthraquinones by carrying out the reduction in the presence of a catalyst. This reduction constitutes an economically interesting process because of the ease with which it can be carried out.

Accordingly, the invention provides a novel process for the preparation of monoaminoanthraquinones of the formula

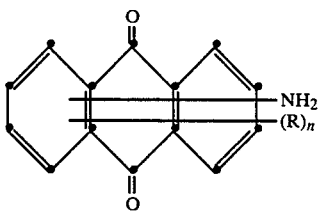

wherein R is a non-ionic substituent and n is 0, 1, 2 or 3, by reacting mononitroanthraquinones with formaldehyde, in the presence of a base and a catalyst, in an aqueous alcoholic solution.

R as a non-ionic substituent is e.g. $C_1$–$C_4$alkyl such as methyl, ethyl, n- and isopropyl; halogen such as fluorine, chlorine and bromine; a hydroxyl group or an anilido group. The anthraquinone molecule may contain one to three of these substituents. Where the anthraquinone molecule contains two or three of these substituents, they may be identical or different substituents selected from the group as defined above.

If sodium hydroxide is used as base, the reaction may be illustrated by the following formulae:

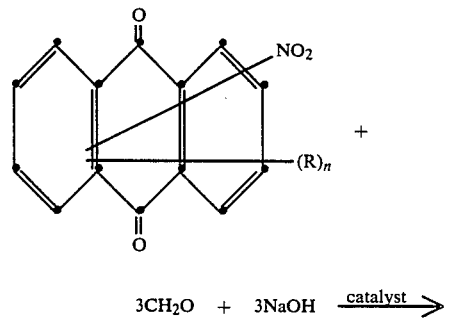

$3CH_2O$ + $3NaOH$ $\xrightarrow{\text{catalyst}}$

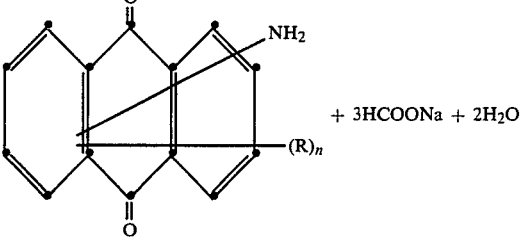

+ $3HCOONa$ + $2H_2O$

Formaldehyde may be used in gaseous from or conveniently as aqueous solution. It is also possible to use compounds which act as formaldehyde donors under the reaction conditions, e.g. paraformaldehyde, trioxan, polyoxymethylene such as tetraoxymethylene, as well as hexamethylenetriamine. The aqueous formaldehyde solution advantageously contains 30 to 55% by weight, preferably 35 to 45% by weight, of formaldehyde. Formaldehyde can be reacted with the mononitroanthraquinone in stoichiometric proportion or in excess thereof, conveniently in an amount of 3 to 20 moles, preferably 3 to 5 moles, of formaldehyde, based on 1 mole of mononitroanthraquinone compound.

The reaction is carried out in the presence of a base, preferably in an amount of 4 to 20 equivalents, most preferably of 6 to 10 equivalents, of the base, based on 1 mole of mononitroanthraquinone compound. Preferred bases are sodium and potassium compounds, in particular hydroxides, carbonates or also mixtures thereof. Examples of suitable bases are: potassium hydroxide, potassium carbonate, sodium carbonate and, preferably, sodium hydroxide.

The reaction is carried out in aqueous alcoholic solution. The ratio of water to alcohol is advantageously from 1:2 to 1:6. Suitable alcohols are monohydric and polyhydric alcohols, e.g. methanol, ethanol, isopropanol and glycol. A preferred solution is an aqueous ethanolic solution.

The catalysts employed in this invention are quinone compounds, preferably naphthoquinone compounds. The preferred catalyst is 2,3-dichloro-1,4-naphthoquinone. The amounts employed vary from 0.3 to 5% by weight, based on the nitroanthraquinone compound.

It is preferred to carry out the reaction in the temperature range from 30° to 100° C., most preferably from 75° to 85° C. The process of this invention is preferably employed for the preparation of 1-aminoanthraquinone.

The monoaminoanthraquinone compounds obtained by the process of this invention are valuable starting materials in particular for obtaining dyes.

The invention is illustrated by the following Examples, in which parts are by weight, unless otherwise stated.

EXAMPLE 1

76 parts of 1-nitroanthraquinone and 0.6 part of 2,3-dichloro-1,4-naphthoquinone in 300 parts by volume of ethanol and 150 parts by volume of 50% aqueous sodium hydroxide solution are heated to 78°–80° C. At this temperature, 37% aqueous formaldehyde solution is added dropwise to the solution in accordance with the consumption. The consumption of formaldehyde can be checked and the addition controlled by measuring the changes in the redox potential. The time taken for the addition is 1½ to 2 hours. The 1-aminoanthraquinone so obtained is then completely precipitated by addition of water, and the precipitate is isolated by filtration, washed with water and dried in vacuo at 80° C. Yield: about 61 g (~91% of theory) of 1-aminoanthraquinone.

EXAMPLE 2

53 parts of 1-nitro-2-methylanthraquinone and 0.6 part of 2,3-dichloro-1,4-naphthoquinone in 300 parts by volume of ethanol and 150 parts by volume of 50% aqueous sodium hydroxide solution are heated to 78°–80° C. At this temperature, 37% aqueous formaldehyde solution is added dropwise to the solution in accordance with the consumption. The consumption of formaldehyde can be checked and the addition controlled by measuring the changes in the redox potential. The time taken for the addition is 1½ to 2 hours. The 1-amino-2-methylanthraquinone so obtained is then completely precipitated by addition of water, and the precipitate is isolated by filtration, washed with water and dried in vacuo at 80° C. Yield: about 43 g (~90% of theory) of 1-amino-2-methylanthraquinone.

EXAMPLE 3

75 parts of a mixture of dihydroxyanilido-mononitroanthraquinone isomers and 0.6 part of 2,3-dichloro-1,4-naphthoquinone in 300 parts by volume of ethanol and 150 parts by volume of 50% aqueous sodium hydroxide solution are heated to 78°–80° C. At this temperature, 37% aqueous formaldehyde solution is added dropwise to the solution in accordance with the consumption. The consumption of formaldehyde can be checked and the addition controlled by measuring the changes in the redox potential. The time taken for the addition is 1½ to 2 hours. The mixture of amino isomers so obtained is then completely precipitated by addition of water, and the precipitate is isolated by filtration, washed with water and dried in vacuo at 80° C. Yield: about 62 g (~89% of theory) of a mixture of dihydroxyanilidomonoaminoanthraquinone isomers.

What is claimed is:

1. A process for the preparation of a monoaminoanthraquinone of the formula

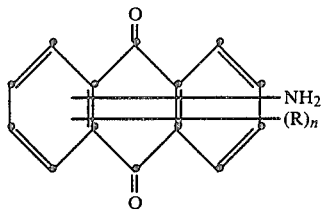

wherein R is a non-ionic substituent and n is 0, 1, 2 or 3, by reduction of a corresponding mononitroanthraquinone, which process comprises reacting said mononitroanthraquinone with formaldehyde, in the presence of a base and 2,3-dichloro-1,4-naphthoquinone as catalyst, in an aqueous alcoholic solution.

2. A process according to claim 1, wherein the reaction is carried out in an aqueous ethanolic solution.

3. A process according to claim 2, wherein the aqueous ethanolic solution consists of 1 part by volume of water and 2 to 6 parts by volume of ethanol.

4. A process according to claim 1, wherein sodium hydroxide is used as base.

5. A process according to claim 1, wherein the reduction is carried out in the temperature range from 75°–85° C.

6. A process according to claim 1 for the preparation of 1-aminoanthraquinone.

* * * * *